US009092694B2

(12) United States Patent
Saunders et al.

(10) Patent No.: US 9,092,694 B2
(45) Date of Patent: Jul. 28, 2015

(54) METHOD AND SYSTEM FOR CREATING A DIGITAL IMAGE ALBUM

(71) Applicant: Xerox Corporation, Norwalk, CT (US)

(72) Inventors: Craig J. Saunders, Grenoble (FR); Luca Marchesotti, Grenoble (FR)

(73) Assignee: Xerox Corporation, Norwalk, CT (US)

(*) Notice: Subject to any disclaimer, the term of this patent is extended or adjusted under 35 U.S.C. 154(b) by 62 days.

(21) Appl. No.: 13/953,775

(22) Filed: Jul. 30, 2013

(65) Prior Publication Data

US 2015/0036940 A1    Feb. 5, 2015

(51) Int. Cl.
*G06K 9/60* (2006.01)
*G06K 9/62* (2006.01)
*G06Q 10/10* (2012.01)
*G06Q 30/02* (2012.01)

(52) U.S. Cl.
CPC ............. *G06K 9/6201* (2013.01); *G06Q 10/10* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 6,636,648 B2 | 10/2003 | Loui et al. | |
| 7,746,512 B2 * | 6/2010 | Yamakado et al. | 358/474 |
| 7,809,154 B2 * | 10/2010 | Lienhart et al. | 382/100 |
| 8,111,303 B2 * | 2/2012 | Tachikawa et al. | 348/231.2 |
| 8,139,826 B2 * | 3/2012 | Ryuto et al. | 382/118 |
| 8,265,429 B2 * | 9/2012 | Sagawa | 382/305 |
| 8,411,968 B2 * | 4/2013 | Isomura et al. | 382/224 |
| 2002/0040375 A1 * | 4/2002 | Simon et al. | 707/517 |
| 2005/0134946 A1 * | 6/2005 | Tsue et al. | 358/537 |
| 2006/0120618 A1 * | 6/2006 | Mizoguchi | 382/255 |
| 2007/0110308 A1 | 5/2007 | Hwang et al. | |
| 2008/0050039 A1 * | 2/2008 | Jin | 382/284 |
| 2008/0306995 A1 | 12/2008 | Newell et al. | |
| 2009/0319472 A1 | 12/2009 | Jain et al. | |
| 2010/0215279 A1 | 8/2010 | Gao et al. | |
| 2012/0206771 A1 * | 8/2012 | Cok | 358/1.18 |
| 2012/0294514 A1 * | 11/2012 | Saunders et al. | 382/159 |
| 2014/0079324 A1 * | 3/2014 | Ishige | 382/224 |
| 2014/0282009 A1 * | 9/2014 | Avrahami | 715/730 |

OTHER PUBLICATIONS

Boll et al., "Semantics, content, and structure of many for the creation of personal photo albums", Proceedings of the 15th international conference on Multimedia, pp. 641-650, Sep. 25-29, 2007, Augsburg, Germany.*
Jain et al., "Image retrieval using color and shape," Pattern Recognition, 29 (8) (1996), pp. 1233-1244.*

(Continued)

*Primary Examiner* — Bhavesh Mehta
*Assistant Examiner* — Feng Niu

(57) ABSTRACT

The disclosed embodiments are related to a method and system for creating a digital image album implementable on a computing device. The method includes receiving a plurality of digital images. The method further includes creating a first signature corresponding to each of the plurality of digital images. The method further includes comparing the first signature corresponding to each of the plurality of digital images with one or more second signatures. Each of the second signatures corresponds to each of one or more prototype digital albums. The method further includes selecting one or more digital images from the plurality of digital images based on the comparison to create the digital image album.

16 Claims, 7 Drawing Sheets

(56) References Cited

OTHER PUBLICATIONS

"Boll et al., "Metaxa—context- and content-driven metadata enhancement for personal photo books," Proc. of the 13th international Multi-Media Modeling conference (MMM), pp. 332-343, Singapore, 2007, Springer."*

G. Csurka, S. Skaff, L. Marchesotti, and C. Saunders. Learning moods and emotions from color combinations. In Proceedings of the Seventh Indian Conference on Computer Vision, Graphics and Image Processing, pp. 298-305. ACM, 2010.

J.A. Aslam and M. Montague. Models for metasearch. In Proceedings of the 24th annual international ACM SIGIR conference on Research and development in information retrieval, pp. 276{284. ACM, 2001.

Y.T. Liu, T.Y. Liu, T. Qin, Z.M. Ma, and H. Li. Supervised rank aggregation. In Proceedings of the 16th international conference on World Wide Web, pp. 481{490. ACM, 2007.

M. Montague and J.A. Aslam. Condorcet fusion for improved retrieval. In Proceedings of the eleventh international conference on Information and knowledge management, pp. 538{548. ACM, 2002.

F.Wei, W. Li, and S. Liu. irank: A rank-learn-combine framework for unsupervised ensemble ranking. Journal of the American Society for Information Science and Technology, 61(6):1232{1243, 2010.

F. Perronnin, Y. Liu, Jorge Sanchez and H. Poiner. Large-Scale Image Retrieval with Compressed Fisher Vectors, 978-1-4244-6983-3/10/ $26.00 © 2010 IEEE.

J. Platt, M. Czerwinski, and B. Field. PhotoTOC: Automatic Clustering for Browsing Personal Photographs.

* cited by examiner

METHOD AND SYSTEM FOR CREATING A DIGITAL IMAGE ALBUM

CROSS-REFERENCE

This application is related to the patent application titled 'METHOD AND SYSTEM FOR CREATING DIGITAL IMAGE ALBUM', U.S. application Ser. No. 13/644,525, filed on Oct. 4, 2012.

TECHNICAL FIELD

More The presently disclosed embodiments are related to the management of digital images. particularly, the presently disclosed embodiments are related to the method and system for creating a digital image album.

BACKGROUND

Over the years, an individual collects hundreds of photographs, which subsequently have to be organized for storage and viewing purposes. The most common manner of organizing these photographs is to place them in albums. Although many people collect photographs, only a few invest time on a regular basis to organize and maintain the photographs. Moreover, with time, the number of unorganized photographs increase, making it difficult to keep the collection organized. Therefore, there is a need to provide efficient techniques for organizing a collection of photographs.

SUMMARY

According to embodiments illustrated herein, there is provided a method for creating a digital image album on a client. The client includes a plurality of digital images. The method includes creating a first signature corresponding to each of the plurality of digital images. The method further includes comparing the first signature corresponding to each of the plurality of digital images with a second signature corresponding to each of one or more prototype digital albums. The method further includes selecting one or more digital images from the plurality of digital images based on the comparison, to create the digital image album.

According to embodiments illustrated herein, there is provided a system for creating a digital image album. The system includes a signature creation module and an album creation module. The signature creation module is configured for creating a first signature corresponding to each of a plurality of digital images. The album creation module is configured for comparing the first signature corresponding to each of the plurality of digital images with one or more second signatures corresponding to each of one or more prototype digital albums. The album creation module is further configured for selecting one or more digital images from the plurality of digital images based on the comparison, to create the digital image album.

According to embodiments illustrated herein, there is provided a computer program product for use with a computer for creating a digital image album. The computer readable program code includes program instruction means for receiving a plurality of digital images. The computer readable program code further includes program instruction means for creating a first signature corresponding to each of the plurality of digital images. The computer readable program code further includes program instruction means for comparing the first signature corresponding to each of the plurality of digital images with a second signature corresponding to each of one or more prototype digital albums. The computer readable program code further includes program instruction means for selecting one or more digital images from the plurality of digital images based on the comparison to create the digital image album.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

Figure 1:
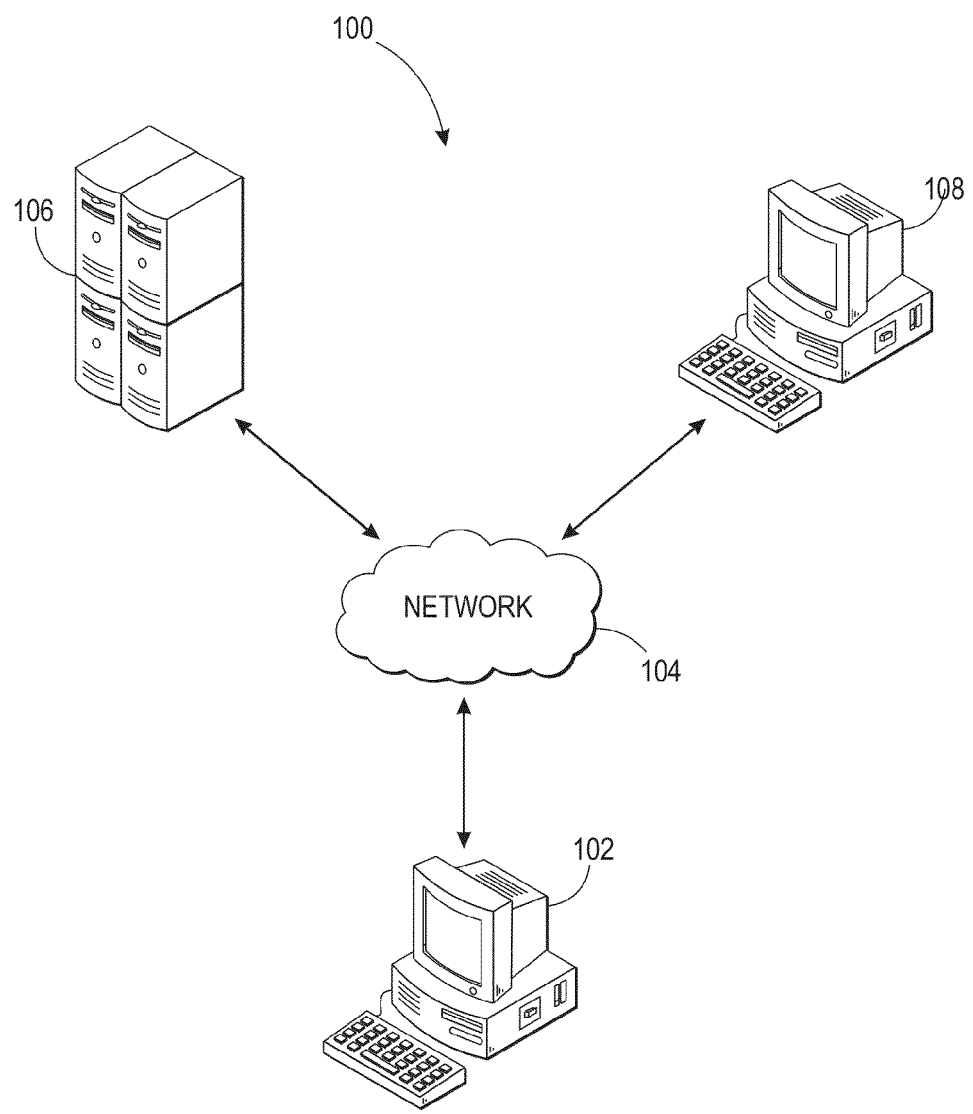
FIG. 1 is a block diagram illustrating a system environment for creating a digital image album in accordance with various embodiments.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meaning set forth below.

A "computing device" refers to a computer, a device including a processor/microcontroller and/or any other electronic component, device or system that performs one or more operations according to one or more programming instructions. Examples of the computational device include, but are not limited to, a desktop computer, a laptop, a personal digital assistant (PDA), a Smartphone, or the like. The computational device is capable of accessing (or being accessed over) a network (e.g., using wired or wireless communication capabilities).

A "network" refers to a medium that interconnects a server and various computational devices. Examples of the network include, but are not limited to, LAN, WLAN, MAN, WAN, and the Internet. The communication over the network may be performed in accordance with various communication protocols such as Transmission Control Protocol and Internet Protocol (TCP/IP), User Datagram Protocol (UDP), and IEEE 802.11n communication protocols.

A "digital image" refers to a collection of data, including image data in any format, retained in an electronic form. The digital image contains one or more pictures of a subject including, but not limited to, a person, animal, place, event, or things. In an embodiment, the digital image is obtained by scanning a corresponding physical document. The digital image can be stored in various file formats such as, JPG or JPEG, GIF, TIFF, PNG, BMP, RAW, PSD, PSP, and PDF.

A "digital image album" refers to a collection of digital images arranged in an order.

A "signature" refers to a data indicative of attributes of the digital image including but not limited to a digital image quality, spatial color distribution, texture, shape, geometry, or combinations thereof.

FIG. 1 is a block diagram illustrating a system environment 100 for creating a digital image album in accordance with various embodiments. The system environment 100 includes a first computing device 102, a network 104, a server 106, and a second computing device 108.

The first computing device 102 and the second computing device 108 generate/receive a plurality of digital images. In an embodiment, the first computing device 102 and the second computing device 108 generates a first signature corresponding to each of the plurality of digital images. Some of the examples of the first computing device 102 include a personal computer, a laptop, a PDA, a mobile device, a tablet, or any device that has the capability to generate one or more queries. For the simplicity of explanation, the two computing devices (102 and 108) are shown; however, the ongoing description is not limited with respect to the number and type of the computing devices. Hereinafter, the first computing device 102 will be explained in conjunction with the other figures of the present disclosure. In an embodiment, the first computing device 102 and the second computing device 108 refers to a client.

The server 106 includes one or more sample digital albums. Each of the one or more sample digital albums includes a plurality of sample digital images. In another embodiment, the server 106 includes one or more prototype digital albums, which are obtained by clustering of the one or more sample digital albums. The server 106 can be a hardware and/or software (e.g., threads, processes, computing devices). The server 106 may be realized through various technologies such as, but not limited to, Microsoft® SQL server, My SQL, and ODBC server.

Figure 2:
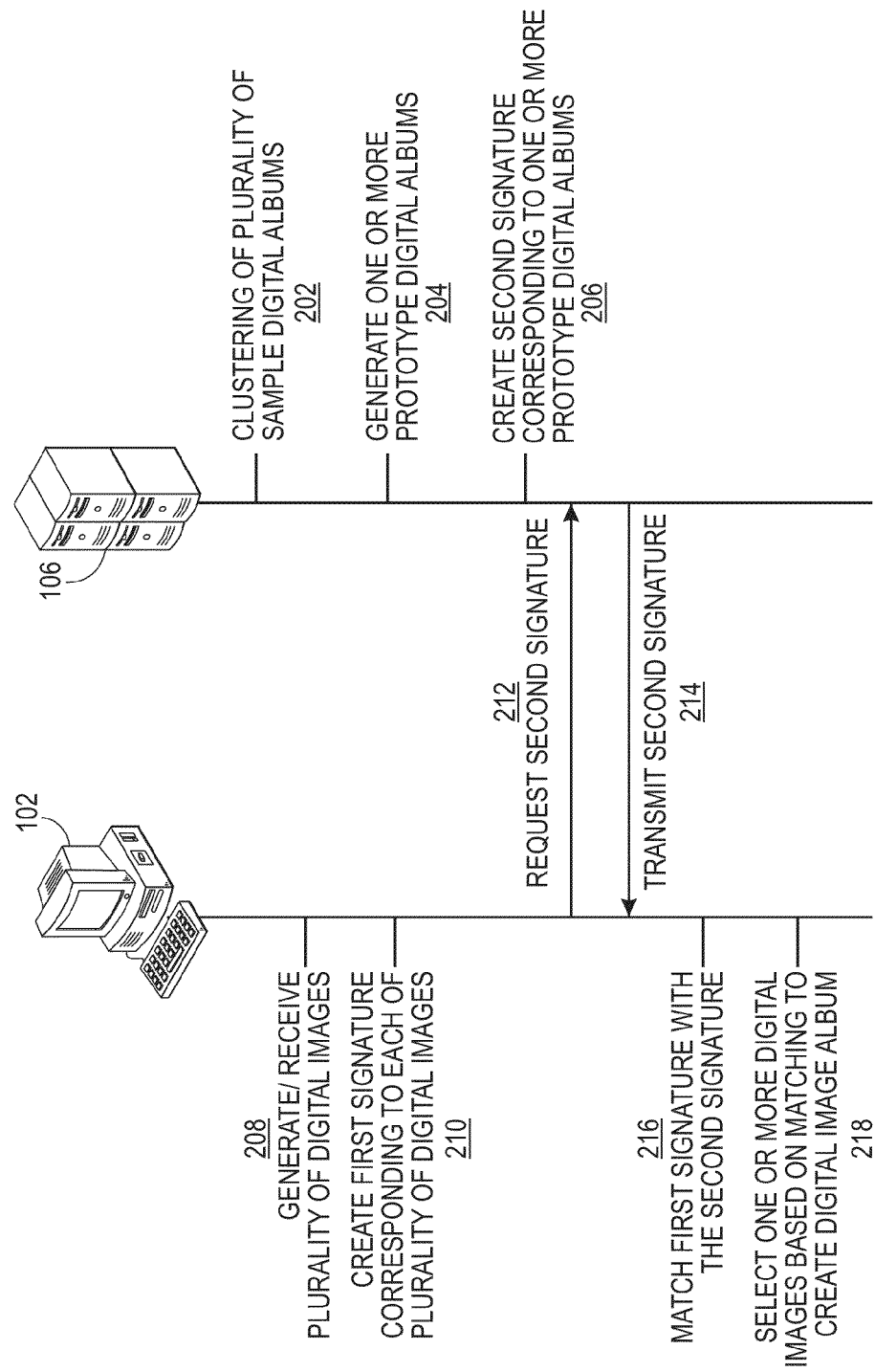
FIG. 2 is a message flow diagram illustrating a flow of messages between the various components of the system environment in accordance with at least one embodiment.

The operation and interaction between the various components of the system environment 100 has been described in conjunction with FIG. 2.

FIG. 2 is a message flow diagram illustrating a flow of messages between the various components of the system environment 100 in accordance with at least one embodiment.

The server 106 stores the one or more sample digital albums. Each of the one or more sample digital albums includes the plurality of sample digital images. The server 106 facilitates the clustering of the one or more sample digital albums to generate the one or more prototype albums (depicted by 202). In an embodiment, the one or more sample digital albums are clustered on the server 106 based on a first pre-defined criteria. The first pre-defined criteria specify at least one of a situation-based and a content-based clustering of the one or more sample digital albums. The event-based clustering of one or more sample digital albums is based on the event when the sample digital images in the one or more sample digital albums are captured. Examples of the events may include but not limited to a birthday celebration, an anniversary celebration, any festival celebration, or the like. The content-based clustering of one or more sample digital albums is based on the content (e.g., colors, texture, shape, and so forth) of the sample digital images in the one or more sample digital albums. It will be understood by a person having ordinary skill in the art that any other suitable criteria may also be considered for clustering the one or more sample digital albums to generate the one or more prototype digital albums.

In an embodiment, the one or more sample digital albums are clustered on the server 106 at a pre-defined frequency. In an embodiment, the frequency of clustering the one or more sample digital albums is proportional to the number of sample digital albums being uploaded onto the server 106.

After the generation of the one or more prototype digital albums (depicted by 204), the server 106 creates the second signature corresponding to each of the one or more prototype digital albums (depicted by 206). In one embodiment, the second signature is created for each of the one or more prototype digital albums. In another embodiment, each of the second signatures corresponding to each of the one or more prototype digital albums is concatenated to form a concatenated second signature.

The first computing device 102 generates/receives the plurality of digital images (depicted by 208). In an embodiment, the first computing device 102 may include the pre-stored plurality of digital images. The first computing device 102 creates the first signature for each of the plurality of digital images. In an embodiment, the first signature is created for each of the plurality of digital images (depicted by 210). In another embodiment, each of the first signatures corresponding to each of the plurality of digital images is concatenated to form a concatenated first signature. Thereafter, the first computing device 102 requests the second signature corresponding to each of the one or more prototype digital albums from the server 106 (depicted by 212). In another embodiment, the first computing device 102 requests for the concatenated second signature from the server 106. In an embodiment, the first computing device 102 sends the request to the server 106 in the form of a query. Thereafter, the server 106 transmits the second signature corresponding to each of the one or more prototype digital albums to the first computing device 102

(depicted by 214). In another embodiment, the server 106 transmits the concatenated second signature to the first computing device 102.

In another embodiment of the present disclosure, the first computing device 102 may request the one or more sample digital albums from the server 106. In an embodiment, the first computing device 102 sends the request to the server 106 in the form of a query. Thereafter, the server 106 transmits the one or more sample digital albums to the first computing device 102. The first computing device 102 facilitates the clustering of the one or more sample digital albums to generate one or more prototype albums. After the generation of the one or more prototype digital albums, the first computing device 102 creates the second signature corresponding to each of the one or more prototype digital albums (depicted by 206).

The first computing device 102 further compares the first signature corresponding to each of the plurality of digital images with the second signature corresponding to each of the one or more prototype digital albums (depicted by 216). In another embodiment, the first computing device 102 compares the first signature corresponding to each of the plurality of digital images with the concatenated second signature.

Based on the comparison between the first signature and the second signature, the first computing device 102 selects one or more digital images from the plurality of digital images (depicted by 218). Thereafter, the first computing device 102 facilitates the creation of the digital image album including the one or more selected digital images based on the comparison.

Figure 3:
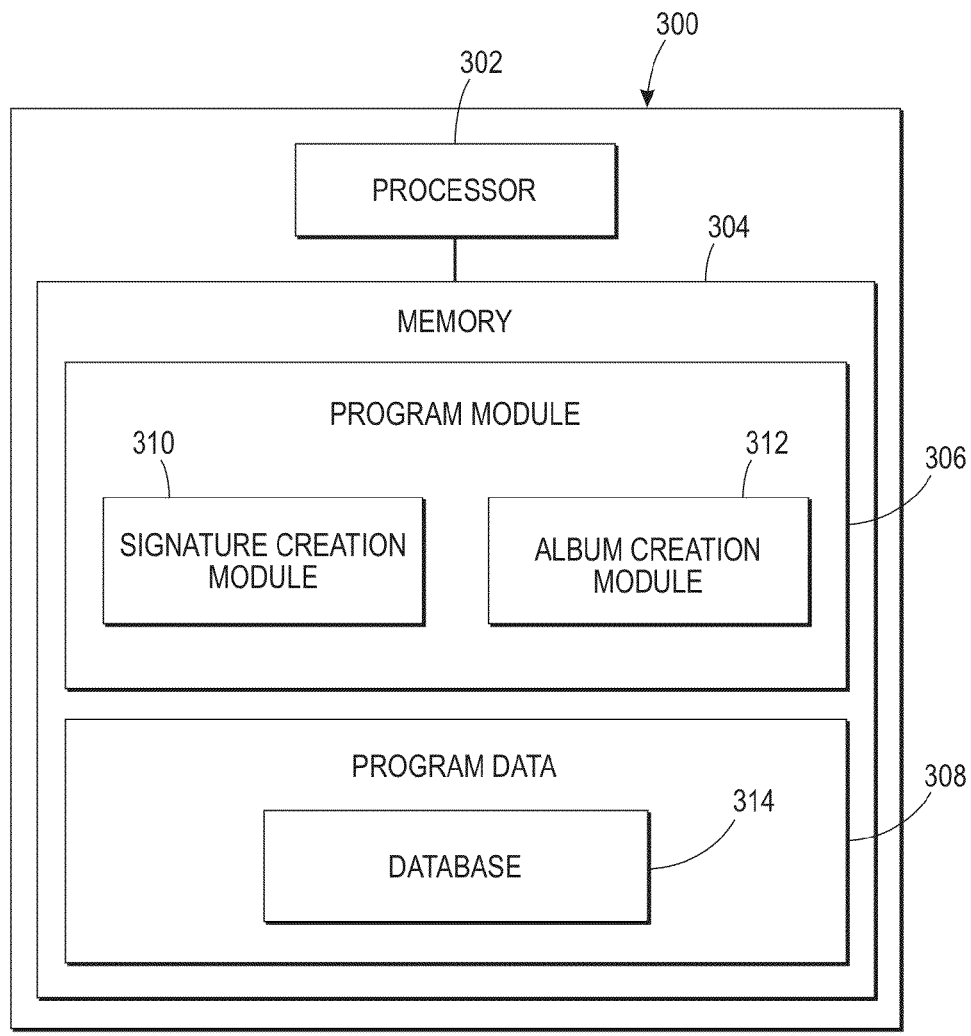
FIG. 3 is a block diagram illustrating a system for creating a digital image album in accordance with various embodiments.

FIG. 3 is a block diagram illustrating a system 300 for creating a digital image album in accordance with at least one embodiment. In an embodiment, the system 300 corresponds to a computing device such as, a Personal Digital Assistant (PDA), a Smartphone, a tablet PC, a laptop, a personal computer, a mobile phone, a Digital Living Network Alliance (DLNA)-enabled device, or the like. In an embodiment, the system 300 corresponds to the first computing device 102.

The system 300 includes a processor 302 and a memory 304. The processor 302 is coupled with the memory 304.

The processor 302 is configured to execute a set of instructions stored in the memory 304 to perform one or more operations. The processor 302 fetches the set of instructions from the memory 304 and executes the set of instructions. The processor 302 can be realized through a number of processor technologies known in the art. Examples of the processor include an X86 processor, a RISC processor, or an ASIC processor. In an embodiment, the processor 302 includes a Graphics Processing Unit (GPU) that executes the set of instructions to perform one or more processing operations.

The memory 304 is configured to store the set of instructions or modules. Some of the commonly known memory implementations can be, but are not limited to, a random access memory (RAM), a read-only memory (ROM), a hard disk drive (HDD), and a secure digital (SD) card. The memory 304 includes a program module 306 and a program data 308. The program module 306 includes a set of instructions that can be executed by the processor 302 to perform specific actions on the system 300. The program module 306 includes a signature creation module 310, and an album creation module 312.

The program data 308 includes a database 314. The database 314 is a storage medium that stores the data submitted from and/or required by the signature creation module 310 and the album creation module 312. In an embodiment, the database 314 can be implemented using technologies, including, but not limited to, Oracle®, IBM DB2®, Microsoft SQL Server®, Microsoft Access®, PostgreSQL®, MySQL®, and SQLite®. In an embodiment, the database 314 stores the plurality of digital images for album creation. In one embodiment, the plurality of digital images is related to a common event and is captured at different times throughout the event. In another embodiment, the plurality of digital images has one or more common subsets of content, such as persons, places and/or objects. For instance, the plurality of digital images may be created via a plurality of users, such as guests at a party or travelers on a trip. It will be understood by a person having ordinary skill in the art that the plurality of digital images may contain any content and can be captured any time at any place.

The plurality of digital images may be obtained from digital cameras or other image capture devices, or they may be from the Internet or other communication channels, or they may be scanned from film or paper prints. The digital image can be stored in substantially any protocol, standard or in formats such as a jpeg, bitmap, gif, jif, png, jng, mng, tif, xif, targa, afi, pix, bpx, psd, pdd, pcd, wmf, palm, pal, pcl, pict, pix, pwp, sun, svg, ttf, vicar, vic, viff, vif, xbm, xcf, xpm, avi, mpeg, mpe, mpg, and wmv. In an embodiment, the plurality of digital images is present in an unorganized form.

In an embodiment, the database 314 stores the one or more sample digital albums or one or more prototype albums corresponding to the one or more sample digital albums received from the server 106. In another embodiment, the database 314 is also configured to store one or more second signatures corresponding to the one or more sample digital albums or one or more prototype albums.

The signature creation module 310 creates a first signature corresponding to each of the plurality of digital images. Thus, for each of the plurality of digital images, the signature creation module 310 creates a corresponding first signature. In order to create the first signature corresponding to each of the plurality of digital images, the signature creation module 310 retrieves the plurality of digital images from the database 314. Thereafter, the signature creation module 310 processes each of the plurality of digital images to create the first signature for each of the plurality of digital images. The first signature for each of the plurality of digital images is created based on the data indicative of features of each of the plurality of digital images. The features of each digital image of the plurality of digital images includes various attributes such as digital image quality, spatial color distribution, texture, shape, and geometry of the each digital image of the plurality of digital images.

In an embodiment, the first signature for each digital image of the plurality of digital images is generated, for example, as a feature vector, by concatenation or other function of the positive (+ve) and negative (−ve) level representations. In one embodiment, the level representation of each digital image is based on fusing (e.g., a sum or concatenation) of positive (+ve) and negative (−ve) level representations, the positive one generated for the salient region (region of interest) of the digital image, the negative one for the non-salient region (i.e., everywhere except the region of interest) of the digital image. In an embodiment, for example, the signature creation module 310 can be implemented using a wavelet transform technique, oriented histograms (HOG, SIFT, SURF) or colour histograms in combination with bag of visual word representation or other higher-level descriptors (Fisher Vector, Supervector, VLAD).

In an embodiment, the signature creation module 310 sends a request to the server 106 for providing the one or more second signatures. Thereafter, the signature creation module 310 receives the one or more second signatures from the server 106 and stores them into the database 314.

In another embodiment, the signature creation module 310 sends a request to the server 106 for providing the one or more sample digital albums. Thereafter, the signature creation module 310 receives the one or more sample digital albums from the server 106 and stores them into the database 314. The signature creation module 310 creates the one or more prototype digital albums by clustering the one or more sample digital albums. The one or more prototype digital albums are then stored in the database 314. Thereafter, the signature creation module 310 creates the one or more second signatures corresponding to the one or more prototype digital albums. In yet another embodiment, the signature creation module 310 is operated to create the one or more second signatures corresponding to each sample digital image in the one or more prototype digital albums.

The one or more second signatures corresponding to at least one of one or more prototype digital albums includes data indicative of features of each sample digital image in the one or more prototype digital albums. The features of each sample digital image in the one or more prototype digital albums includes attributes such as digital image quality, spatial color distribution, texture, shape, and geometry. In an embodiment, the one or more second signature for each sample digital image in the one or more prototype digital albums is generated, for example, as a feature vector, for example, by concatenation or other function of the +ve and −ve level representations. In one embodiment, the level representation of each sample digital image is based on fusing (e.g., a sum or concatenation) of positive (+ve) and negative (−ve) level representations. The positive one is generated for the salient region (region of interest) of the sample digital image. The negative one is generated for the non-salient region (i.e., everywhere except the region of interest) of the sample digital image.

The album creation module 312 is configured for creating the digital image album including one or more digital images of the plurality of digital images. In order to create the digital image album, the album creation module 312 retrieves the first signature corresponding to each of the plurality of digital images and the one or more second signatures from the database 314. After the retrieval, the album creation module 312 compares the first signature with the one or more second signatures. The comparing of the first signature with the one or more second signatures includes calculating or determining the distance between the first signatures and the one or more second signatures. In an embodiment, on the basis of the determined distance, a score is assigned to each of the one or more second signatures, which corresponds to each of one or more prototype digital albums or each sample digital image in the one or more prototype digital albums. In an embodiment, the score is represented as a numerical value. For example, the score is assigned from "1" to "10". In an embodiment, "1" is considered as the lowest score and "10" is considered as the highest score. In another embodiment, "10" may be considered as the lowest score and "1" may be considered as the highest score.

In one embodiment, the one or more prototype digital albums or each sample digital image in the one or more prototype digital albums is considered closest to the plurality of digital images if the one or more prototype digital albums or each sample digital image in one or more prototype digital albums is assigned a low score.

In another embodiment, the one or more prototype digital albums or each sample digital image in the one or more prototype digital albums is considered closest to the plurality of digital images if the one or more prototype digital albums or each sample digital image in the one or more prototype digital albums is assigned a high score.

In an embodiment, the album creation module 312 can be implemented using various signature comparing techniques/algorithms capable of comparing the first signatures with the one or more second signatures.

The album creation module 312 then selects the one or more digital images from the plurality of digital images based on the scores obtained from the results of comparing the first signature and the one or more second signatures. In an embodiment, the album creation module 312 selects the prototype digital album from the one or more prototype digital albums or each sample digital image in the one or more prototype digital albums assigned the smallest score. In another embodiment, the album creation module 312 may select the prototype digital album from the one or more prototype digital albums or each sample digital image in the one or more prototype digital albums assigned the highest score. Thereafter, the album creation module 312 will select the one or more digital images from the plurality of digital images and generate the digital image album with the set of digital images from the plurality of digital images in the same order as present in the selected prototype digital album from the one or more prototype digital albums or each sample digital image in the one or more prototype digital albums.

Figure 4:
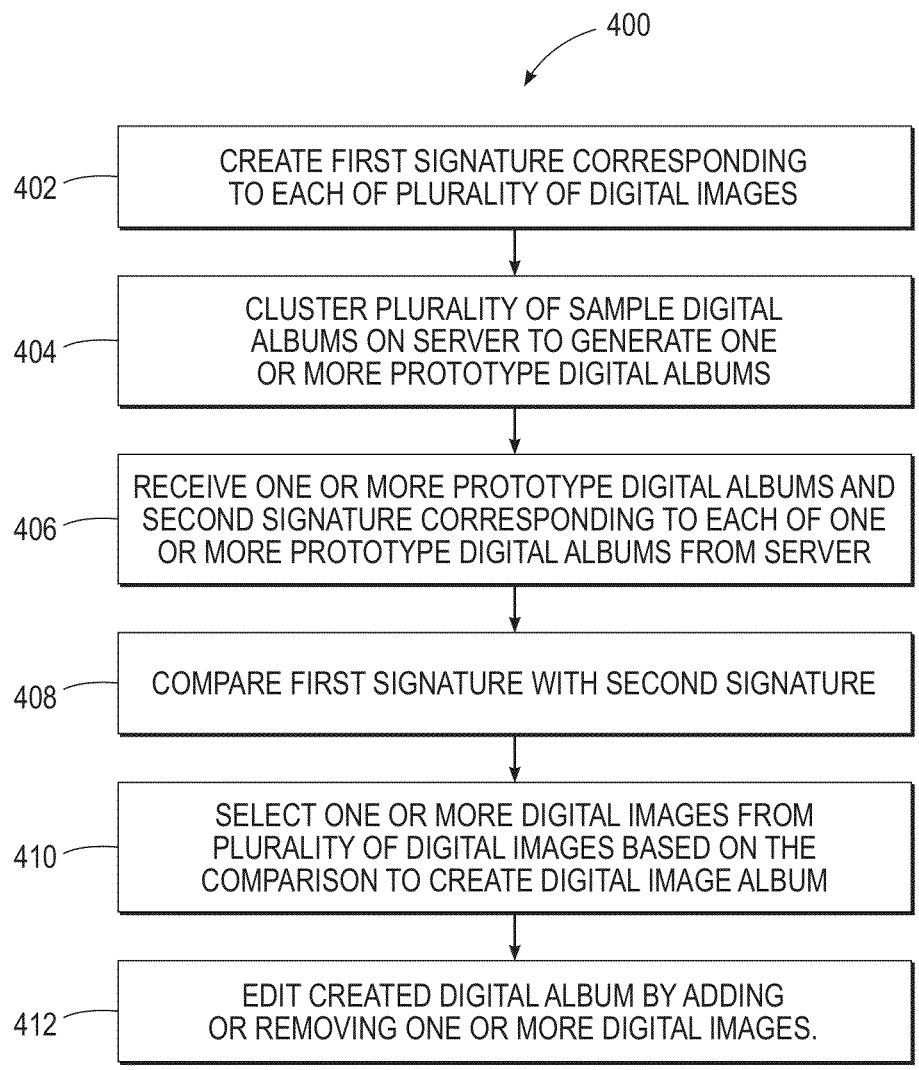
FIG. 4 is a flow diagram illustrating a method for creating a digital image album on a client in accordance with an embodiment.

FIG. 4 is a flow diagram 400 illustrating a method for creating a digital image album on a client in accordance with an embodiment.

At step 402, the first signature corresponding to each digital image of the plurality of digital images is created at the first computing device 102 (e.g., client). In an embodiment, the first signature corresponding to each digital image of the plurality of digital images is created by the signature creation module 310.

At step 404, the plurality of sample digital albums are clustered to generate the one or more prototype digital albums. In an embodiment, the clustering of the plurality of sample digital albums is performed by signature creation module 310 of the first computing device 102. In another embodiment, the clustering is performed at the server 106.

At step 406, the second signature corresponding to each of the one or more prototype digital albums is received. In an embodiment, the second signature corresponding to each of the one or more prototype digital albums is created on the server 106 and received by the first computing device 102 based on a request. In another embodiment, the second signature corresponding to each of the one or more prototype digital albums is created by the signature creation module 310. This is further explained in detail in conjunction with FIG. 1 and FIG. 3.

At step 408, the first signature is compared with the second signature. In an embodiment, the first signature is compared with the second signature by the album creation module 312. The comparing includes measuring the distance between the first signature and the second signature. In an embodiment, the distance is simple Euclidean distance. In another embodiment, the distance is based on a specific application. The distance between the first signature and the second signature is measured in order to calculate a score. The distance between the first signature and the second signature corresponds to a measure of the closeness of the aesthetic appear ance of the digital image and that of the images of the prototype digital albums. For example:

- Distance value close to 1 (e.g., between 0.5 and 1) indicates that the digital image having the first signature is close to the images of the prototype album having the second signature
- Distance value close to 0 (e.g., between 0 and 0.5) indicates that the digital image having the first signature is very different than the images of the prototype album having the second signature At step 410, the one or more digital images are selected from the plurality of digital images based on the comparison to create the digital image album. In an embodiment, the one or more digital images are selected from the plurality of digital images by the album creation module 312.

At step 412, the created digital album is edited by adding or removing one or more digital images. In an embodiment, the digital image album created is edited by the album creation module 312.

Figure 5A:
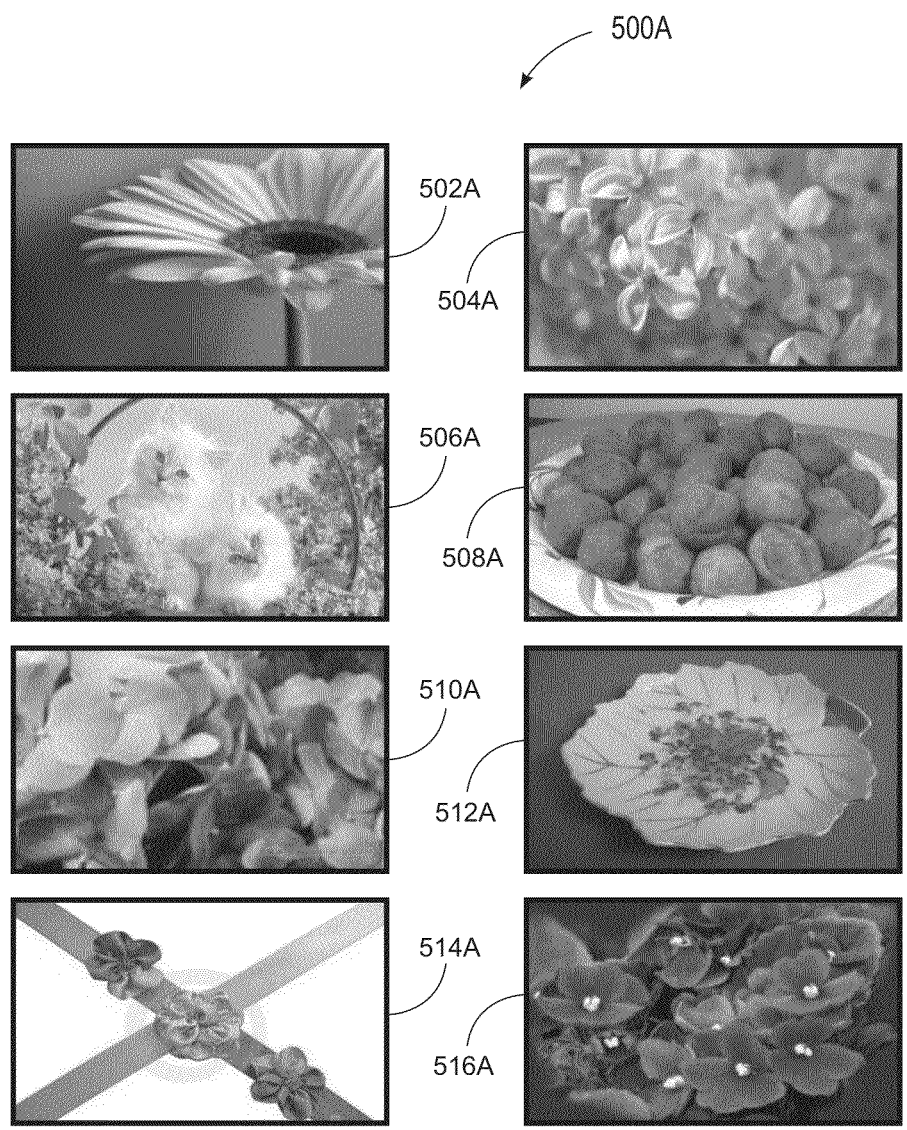
FIG. 5A depicts a set of digital images in accordance with an embodiment.
Figure 5B:
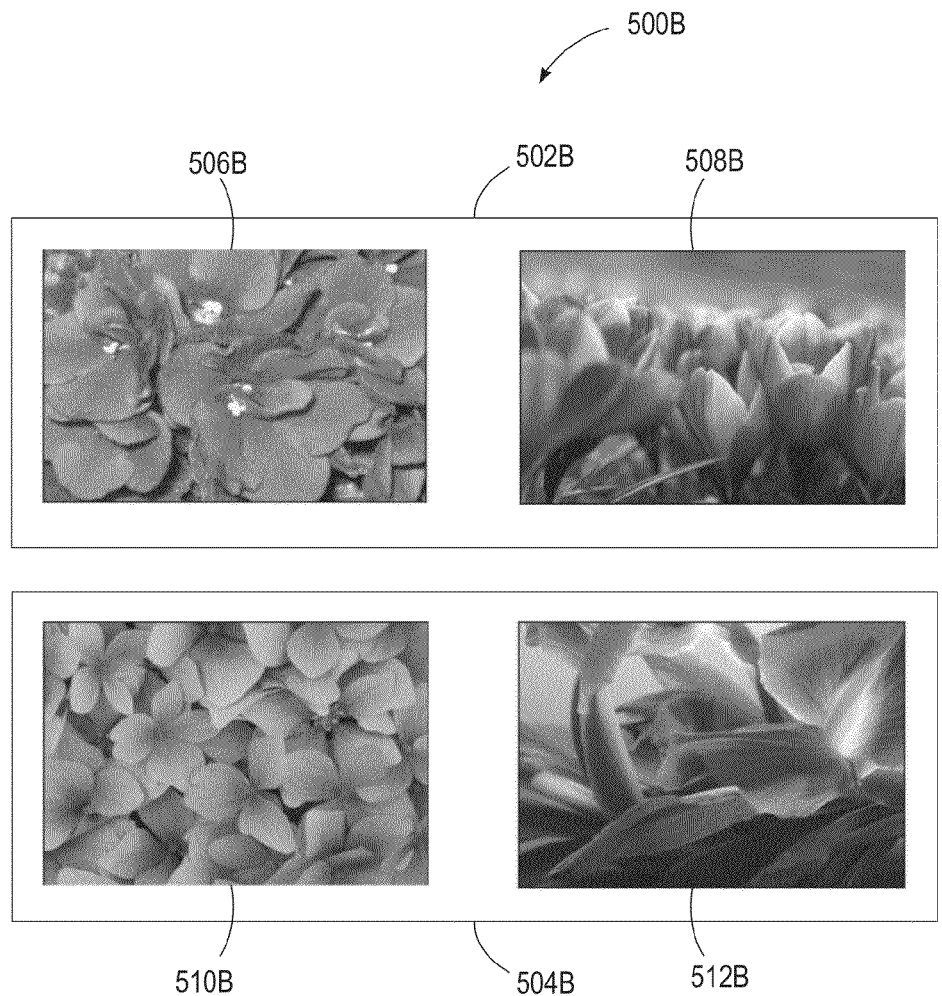
FIG. 5B depicts a set of sample digital image albums in accordance with an embodiment.
Figure 5C:
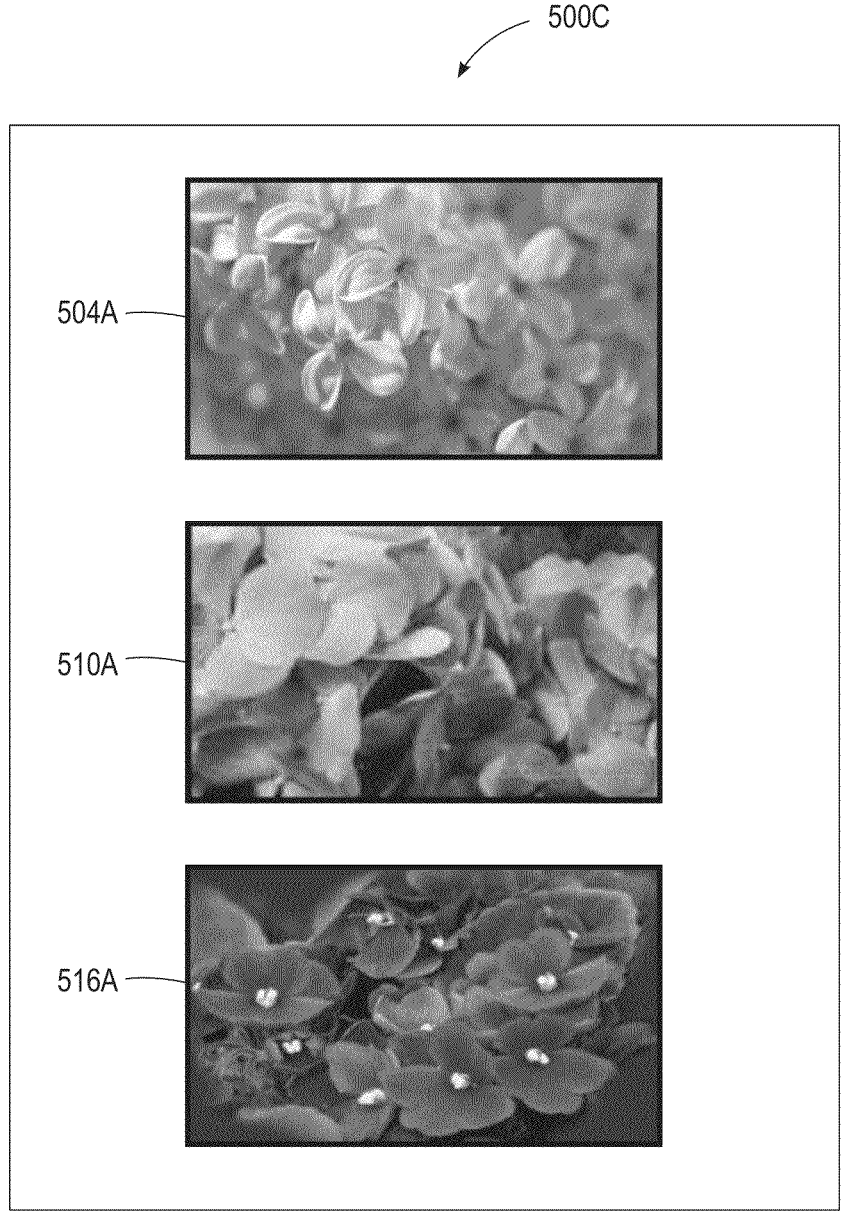
FIG. 5C depicts a digital image album in accordance with an embodiment.

FIG. 5A depicts a set of digital images 500a in accordance with an embodiment. FIG. 5B depicts a set of sample digital image albums 500b in accordance with an embodiment. FIG. 5C depicts a digital image album 500c in accordance with an embodiment. The set of digital images 500a includes the digital images 502a-516a, from which a digital album needs to be created. The set of sample digital image albums 500b includes sample digital image albums 502b and 504b.

In accordance with step 402, the signature creation module 310 creates the first signature for each of the digital images 502a-516a based on the various attributes associated with the digital images 502a-516a. The first signature may be stored in the database 314.

In accordance with step 404, the prototype album (not shown) is generated by clustering the sample digital albums 502b and 504b based on the pre-defined criteria. As discussed in FIG. 3, the clustering may be performed by the signature creation module 310 or the server 106.

In accordance with step 406, the second signature corresponding to the prototype album is created by the signature creation module 310. In an alternate embodiment, the second signature corresponding to the prototype album is created by the server 106 and is provided to the signature creation module 310 in response to the request.

In accordance with step 408, first signature corresponding to the digital images 302a-316a and the second signature corresponding to the prototype digital album are compared by the album creation module 312. Based on the comparison, the album creation module 312 measures the distance between the first signature and the second signature to find out the closeness of aesthetic appearance of the digital images 502a-516a and the digital images 506b-512b of the prototype digital album. Below is provided an illustration of the distance measured by the album creation module 312:

TABLE 1

Illustration of the distance between the digital images and the prototype digital album.

| Digital Image | Distance from the prototype digital album |
|---|---|
| 502a | 0.2 |
| 504a | 0.9 |
| 506a | 0.2 |
| 508a | 0.1 |
| 510a | 0.8 |
| 512a | 0.3 |

TABLE 1-continued

Illustration of the distance between the digital images and the prototype digital album.

| Digital Image | Distance from the prototype digital album |
|---|---|
| 514a | 0.1 |
| 516a | 0.8 |

In accordance with step 410, the digital album 500c is created by the album creation module 312 based on the measured distances. For example, it can be observed from Table 1 that the distance of the digital images 504a, 510a, and 516a is near 1, indicating that these three digital images are close to the prototype album. Therefore, the digital images 504a, 510a, 516a will be used to create the digital album 500c. The digital album 500c may be stored in the database 314 for later retrieval.

In accordance with step 412, the digital album 500c may be edited by album creation module 312 by adding/removing more digital images.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product for creating a digital image album, as described above, have numerous advantages. Some of these advantages may include, but are not limited to, resizing, cropping, rotating, inclusion or removal of digital images in the digital image album. In addition, the user (owner of the digital images) saves time and effort to organize and maintain the digital images (photographs).

Various embodiments of the method and system for creating the digital image album have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof. It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for creating a digital image album on a client device, the client device comprises a plurality of digital images, the method comprising:

receiving, by a processor, a second signature corresponding to each of one or more prototype digital albums from a server, wherein the one or more prototype digital albums are generated, at the server, based on at least a clustering of one or more sample digital albums, wherein each sample digital album comprises a plurality of sample digital images;

generating, by the processor, a first signature corresponding to each of the plurality of digital images;

comparing, by the processor, the first signature corresponding to each of the plurality of digital images with the second signature corresponding to each of the one or more prototype digital albums, wherein the comparison is based on at least a distance between the first signature and the second signature, wherein the distance corresponds to a measure of a closeness of an aesthetic appearance of the each of the plurality of digital images and one or more sample digital images in each of the one or more prototype digital albums;

determining, by the processor, a score, for the one or more second signatures corresponding to each of the one or more prototype digital albums, based on at least the comparison; and selecting, by the processor, one or more digital images from the plurality of digital images based on at least the score to create the digital image album, wherein the digital image album does not comprise the one or more sample digital images.

2. The method of claim 1 further comprising receiving the one or more prototype digital albums from the server.

3. The method of claim 1, wherein the one or more digital images are selected from the plurality of digital images on the basis of similarity in at least one of a color or a background theme.

4. The method of claim 1 further comprising uploading the created digital image album on the server.

5. The method of claim 1, wherein the comparing comprises calculating a distance between the first signature corresponding to each of the plurality of digital images and the second signature corresponding to each of the one or more prototype digital albums.

6. The method of claim 1 further comprising removing one or more duplicate digital images of each digital image in the plurality of digital images.

7. The method of claim 1 further comprising editing the created digital image album, wherein the editing comprises adding or removing one or more digital images.

8. The method of claim 1, wherein the comparing comprises calculating a distance between the first signature corresponding to each of the plurality of digital images and the one or more second signatures.

9. A system for creating a digital image album on a client device, the system comprising:

a processor configured to receive one or more second signatures corresponding to each of one or more prototype digital albums from a server, wherein the one or more prototype digital albums are generated, at the server, based on at least a clustering of one or more sample digital albums, wherein each sample digital album comprises a plurality of sample digital images;

a memory comprising:
a signature creation module configured to generate a first signature corresponding to each of a plurality of digital images; and
an album creation module configured to:
compare the first signature corresponding to each of the plurality of digital images with the one or more second signatures corresponding to each of the one or more prototype digital albums, wherein the comparison is based on at least a distance between the first signature and the second signature, wherein the distance corresponds to a measure of a closeness of an aesthetic appearance of the each of the plurality of digital images and one or more sample digital images in each of the one or more prototype digital albums; and
determine a score, for the one or more second signatures corresponding to each of the one or more prototype digital albums, based on at least the comparison; select one or more digital images from the plurality of digital images based on at least the score to create the digital image album, wherein the digital image album does not comprise the one or more sample digital images; and
the processor coupled to the memory for executing the signature creation module and the album creation module.

10. The system of claim 9 further comprising a database for storing the digital image album.

11. The system of claim 9, wherein the signature creation module is further configured to create the one or more second signatures.

12. The system of claim 9, wherein the album creation module is further configured to:
select one or more digital images from the plurality of digital images having similarity in at least one of a color or a background theme; and
remove one or more duplicate digital images of each digital image in the plurality of digital images.

13. A computer program product for use with a computer, the computer program product comprising a non-transitory computer-readable medium storing a computer-readable program code embodied therein for creating a digital image album, the computer-readable program code comprising:
program instruction means for receiving a second signature corresponding to each of one or more prototype digital albums from a server, wherein the one or more prototype digital albums are generated, at the server, based on at least a clustering of one or more sample digital albums, wherein each sample digital album comprises a plurality of sample digital images;
program instruction means for creating a first signature corresponding to each of the plurality of digital images;
program instruction means for comparing the first signature corresponding to each of the plurality of digital images with a second signature corresponding to each of one or more prototype digital albums, wherein the comparison is based on at least a distance between the first signature and the second signature, wherein the distance corresponds to a measure of a closeness of an aesthetic appearance of the each of the plurality of digital images and one or more sample digital images in each of the one or more prototype digital albums; and
program instruction means for determining a score, for the one or more second signatures corresponding to each of the one or more prototype digital albums, based on at least the comparison; program instruction means for selecting one or more digital images from the plurality of digital images based on at least the score to create the digital image album, wherein the digital image album does not comprise the one or more sample digital images.

14. The computer program product of claim 13 further comprising program instruction means for receiving the one or more prototype digital albums from the server.

15. The computer program product of claim 13 further comprising program instruction means for receiving the second signature corresponding to each of the one or more prototype digital albums from the server.

16. The computer program product of claim 13 further comprising program instruction means for editing the created digital image album, wherein the editing comprises adding or removing one or more digital images.

* * * * *